United States Patent [19]

Yada et al.

[11] Patent Number: 4,690,788
[45] Date of Patent: Sep. 1, 1987

[54] PROCESS FOR PREPARING WATER-SOLUBLE POLYMER GEL PARTICLES

[75] Inventors: Akira Yada; Shusaku Matsumoto, both of Kyoto; Yoshihiro Kawamori, Joyo; Takao Saito, Nagaokakyo; Tadashi Nishiyama; Yoshitugu Adachi, both of Kyoto, all of Japan

[73] Assignee: Dai-Ichi Kogyo Seiyaku Co., Ltd., Kyoto, Japan

[21] Appl. No.: 795,263

[22] Filed: Nov. 5, 1985

[30] Foreign Application Priority Data

Nov. 6, 1984 [JP] Japan ................................ 59-233560
Nov. 6, 1984 [JP] Japan ................................ 59-233561
Nov. 13, 1984 [JP] Japan ................................ 59-239229

[51] Int. Cl.$^4$ .......................... B02C 4/08; B29B 9/02; B29C 33/06; B29C 35/08
[52] U.S. Cl. ..................................... 264/22; 264/130; 264/144; 264/146; 264/213; 524/916
[58] Field of Search ............... 264/140, 144, 145, 146, 264/22, 213, 216, 147, 118, 130; 524/916, 922

[56] References Cited

U.S. PATENT DOCUMENTS

| | | | |
|---|---|---|---|
| 2,516,295 | 7/1950 | Borton et al. | 18/47.5 |
| 3,514,368 | 5/1970 | Netsel | 161/177 |
| 4,134,871 | 1/1979 | Otani et al. | 260/29.6 |
| 4,340,342 | 7/1982 | Kim | 425/72 R |
| 4,425,287 | 1/1984 | Hesse et al. | 264/22 |
| 4,525,509 | 6/1985 | Hunter et al. | 524/141 |

Primary Examiner—Jan H. Silbaugh
Assistant Examiner—Karen D. Kutach
Attorney, Agent, or Firm—Antonelli, Terry & Wands

[57] ABSTRACT

A novel process for preparing particles of polymer gel prepared by polymerizing an aqueous solution of water-soluble vinyl monomers which comprises breaking the polymer gel into particles with a breaker device wherein the gel is cut into strips by a pair of rollers having a plurality of annular projections or grooves on their surfaces, the rollers rotating in an opposite direction to each other to engage each other and cut off the gel fed between the rollers, and the strips are then cut into particles by a combination of a fixed cutting blade and a rotating cutting blade. The obtained gel particles are further pulverized into fine round or particles spherical in a vertical type cutter comprising at least one vertically fixed cutting blade and a rotary cutting blade arranged rotatably and vertically, a clearance being provided between an edge of the rotary cutting blade and an edge of the fixed blade.

19 Claims, 11 Drawing Figures

PROCESS FOR PREPARING WATER-SOLUBLE POLYMER GEL PARTICLES

BACKGROUND OF THE INVENTION

The present invention relates to a process for preparing pulverized gels of water-soluble vinyl polymers, and more particularly to a process for preparing particulate water-soluble vinyl polymers without deteriorating the quality of the polymers, without lowering the molecular weight and providing decreased sticking of polymer particles to each other.

Water-soluble acrylic polymers, particularly acrylamide homopolymer, copolymers of a major amount of acrylamide and other copolymerizable monomers, or alkali hydrolysis products of these acrylamide polymers have been widely utilized as sizing agent, viscosity builder, soil improver, waste water treating agent, agent for recovering crude oil, etc. These watersoluble acrylamide polymers have been prepared by bulk polymerization, suspension polymerization, emulsion polymerization or solution polymerization. In general, polymerization of aqueous solutions of monomers has been mainly adopted, since polymers having a high molecular weight are obtained.

For obtaining polymers having a very high molecular weight and moreover having a good water solubility by means of the aqueous solution polymerization method, it is necessary to prevent crosslinking reactions during polymerization as much as possible. In this respect, it is desirable to conduct the preparation of polymers under relatively mild conditions, e.g. conducting polymerization with relatively low concentration of a monomer.

In recent years, due to economic considerations such as transportation costs and storage costs, water-soluble polymers in the form of powder are demanded rather than in the form of an aqueous solution. An aqueous solution polymerization at a low monomer concentration has the defect that the obtained polymers must be dried to evaporate a large quantity of water upon powdering, thus resulting in increase of utility cost for powdering.

Also, partially hydrolyzed acrylamide polymers have been usually prepared by partially hydrolyzing acrylamide polymer gels by using alkaline materials or the like. In that case, too, use of polymer gels having a relatively low concentration of polymers is desired, since it is necessary to make the alkaline material penetrate into the inside of the gels so as to uniformly perform partial hydrolysis. On the other hand, use of the polymer gels having a low concentration has the disadvantages that utility cost for evaporating water is increased and that the polymer gel particles adhere to each other to form agglomerates and the agglomeration remarkably lowers the drying efficiency in the drying of the particles.

In order to eliminate the above-mentioned defects, a study has been made to provide a process for practicing the polymerization at a monomer concentration as high as possible to provide a reduction in the utility cost at the powdering stage.

Vinyl monomers such as acrylamide and acrylic acid show a marked tendency to crosslink and to form a three dimensional structure. Accordingly, in practice, in order to prevent crosslinking from occurring, the polymerization has inevitably been conducted under mild conditions, especially in a relatively low monomer concentration, for example, in a concentration of at most 20 to 30% by weight for anionic or non-ionic monomers.

The polymerization products obtained by subjecting an aqueous monomer solution containing acrylamide alone or containing mainly acrylamide in a low concentration as mentioned above to the polymerization are in the form of a hard or elastic gel having no fluidity. Therefore, when water is removed from the obtained massive or sheet-like polymer gel without mechanically breaking it into pieces, the gel must be allowed to stand at high temperatures for a very long period of time. As a result, the molecular weight is lowered and crosslinking accompanied by heating for drying takes place, thus resulting in marked lowering of the commercial value of the products. Accordingly, there has generally been adopted a process wherein after roughly pulverizing the massive or sheet-like polymer gel to form coarse particles by a mechanical means, water is removed from the particles by drying with heat. In a widely adopted process of drying, a polymer gel obtained by polymerization is formed into a strand-like form by an extruder like a meat grinder, and then dried by heating. However, the use of the extruder is not always satisfactory, particularly when the polymer is very hard, because the friction against the wall surface of the extruder is large, thus not only the machine efficiency is decreased, but also the polymer gel itself is subject to deterioration due to frictional heat or mechanical force, thereby resulting in lowering of the molecular weight due to severance of the polymer molecule.

In order to reduce the frictional resistance of machines, it is proposed to use a lubricant such as polyethylene glycol or non-ionic surfactants upon extruding the polymer gel. However, a large amount of the lubricant must be used for obtaining a satisfactory effect, and it rather brings about undesirable results such as decrease in the purity, increase in sliminess of polymer powder and lowering in free flowability of polymer powder.

For such reasons, it is important to develop a process for pulverizing polymer gels without suffering deterioration due to frictional heat and mechanical force and without lowering the molecular weight.

It is an object of the present invention to solve the above-mentioned problems such as deterioration of polymer gels caused by frictional heat and mechanical force upon breaking or pulverizing the gels, and decrease in purity and flowability of polymers and increase in sliminess of powder which occur when a lubricant is used in pulverizing the gels.

A further object of the invention is to provide a process for easily pulverizing aqueous gels of watersoluble vinyl polymers without deteriorating the polymers and lowering the molecular weight.

A still further object of the invention is to provide a process for preparing finely divided gels of water-soluble vinyl polymers, without, allowing the gels to stick to each other and to an apparatus for performing the process, which gels can be easily dried to give dry powders without causing undesirable crosslinking of the polymers.

These and other objects of the present invention will become apparent from the following description.

SUMMARY OF THE INVENTION

In accordance with one of the fundamental aspects of the present invention, there is provided a process for preparing polymer gel particles from an aqueous polymer gel obtained by subjecting an aqueous solution of a water-soluble vinyl monomer to polymerization which comprises feeding said polymer gel to a roller cutter including a pair of rollers so as to make said pair of rollers bite into said polymer gel, the pair of rollers having a plurality of annular projections or grooves at predetermined intervals on their surfaces and rotating in the opposite direction to each other to engage with each other, thereby cutting the polymer gel into strips, and cutting said strips into pieces by a combination of a fixed blade with a rotary cutter, said fixed cutting blade extending in the axial direction of said roller cutter over at least the full length of said roller cutter and said rotary cutter including a rotatable cylindrical body provided on its periphery with at least one cutting blade extending in the axial direction.

In another aspect of the present invention, the thus obtained polymer gel pieces are further pulverized into particles by a vertical type cutter comprising a casing, at least one vertically fixed cutting blade arranged in said casing in a vertical direction, a rotary cutting blade provided rotatably and vertically in said casing and positioned to minimize a clearance between it and said fixed blade, and a screen which is arranged to form a cutting chamber with an inner wall of said casing and through which the pulverized gel particles are taken out.

DETAILED DESCRIPTION

Figure 2:
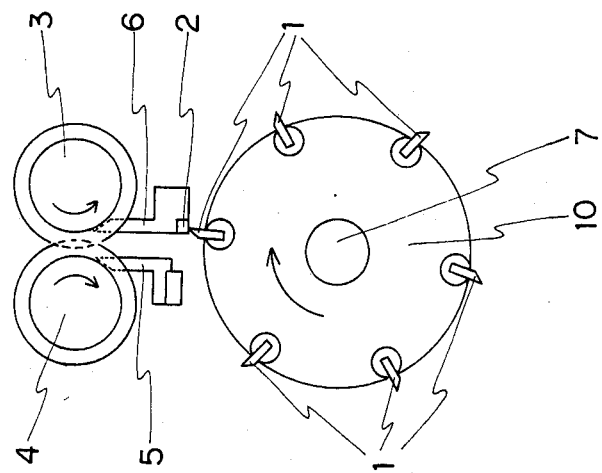
FIG. 2 is a section view taken on line I—I of FIG. 1.

The process of the present invention is applicable to polymers of water-soluble vinyl monomers, for example, water-soluble acrylamide polymers such as copolymers of at least 5% by weight, especially at least 30% by weight, of acrylamide and other water-soluble vinyl monomers, homopolymers of acrylic acid, methacrylic acid or their salts such as alkali metal salts, water-soluble cationic acrylic polymers, and other water-soluble vinyl polymers. The acrylamide polymers include, for instance, a homopolymer of acrylamide, methacrylamide or their derivatives such as a dialkylacrylamide and acrylamide-2-methylpropane sulfonic acid, a copolymer of these monomers, and a copolymer of acrylamide, methacrylamide or their derivatives with other water-soluble vinyl monomers.

Representative examples of the water-soluble vinyl monomer used in the present invention are, for instance, acrylamide, methacrylamide, ethylenically unsaturated carboxylic acids such as acrylic acid, methacrylic acid and itaconic acid or their salts, ethylenically unsaturated sulfonic acids such as vinyl sulfonic acid and 2-acrylamide-2-methylpropane sulfonic acid or their salts, dialkylaminoalkyl acrylates and methacrylates, the metal salts, quaternary salts and salts with acids of the dialkylaminoalkyl acrylates and methacrylates, dialkylaminoalkyl acrylamindes, the quaternary salts and salts with acids of the dialkylaminoalkyl acrylamides, diallylamine compounds such as salts with acids of diallylamine and diallyldialkyl ammonium salts, and the like, but the water-soluble vinyl monomers are not limited thereto. The water-soluble vinyl monomers may be employed alone or in admixture thereof. Also, the water-soluble vinyl monomers may be employed with substantially water-insoluble monomers so long as the produced polymers are soluble in water, e.g. hydrophobic vinyl monomers such as acrylonitrile, acrylic or methacrylic acid esters, vinyl acetate and styrene.

The polymerization of water-soluble vinyl monomers can be made by usual methods without any restriction, e.g. a thermal polymerization method using known radical polymerization initiators such as persulfate or azo initiators, a redox polymerization method using known redox initiators such as persulfate/amine or persulfate/sulfite initiators, a photopolymerization method using photoactivatable initiators such as benzoin or a benzoin alkyl ether, and a radiation polymerization method. In general, an aqueous solution of monomers is subjected to the polymerizaton by such known methods at least until the reaction mixture loses its free fluidity.

The photopolymerization by irradiation of light rays such as ultraviolet rays, particularly photopolymerization conducted by irradiating ultraviolet rays to an aqueous monomer solution in the form of a thin layer, is advantageous. Since the induction period up to initiation of the polymerization is very short and moreover the rate of polymerization is much larger as compared with other polymerization methods, the time required in polymerization is short and it is possible to make the polymerization apparatus compact. Also, the photopolymerization is suitable for the polymerization of an aqueous monomer solution having a high concentration. Further, when the photopolymerization is adopted, it is possible to conduct a continuous polymerization by continuously supplying an aqueous solution containing a monomer and a photoinitiator onto a moving support, e.g. an endless belt, in the form of a thin layer, irradiating ultraviolet rays to the thin layer to polymerize the monomer, and continuously peeling off the produced polymer layer. In that case, the breaking and pulverizing of the obtained sheet-like polymer gel can be made continuous.

From the viewpoint of productivity, it is preferable that the concentration of the obtained aqueous polymer gel is as high as possible. This is also preferable in that the stickiness of the gel is decreased and, therefore, upon breaking or pulverizing the gel into particles, the particles are prevented from sticking to each other. In general, the concentrations of the polymer in the gel are from 20 to 60% by weight, preferably 30 to 45% by weight, for non-ionic polymers and anionic polymers such as polyacrylamide and a copolymer of arylamide and acrylic acid, and from 50 to 90% by weight, preferably 60 to 80% by weight, for cationic polymers such as a copolymer of acrylamide and a dialkylaminoalkyl acrylate or the acid salt or quaternary salt thereof.

In the present invention, the polymer gel is cut into strips by a roller type cutter mentioned hereinafter in detail. Preferably, the polymer gel obtained by polymerizing an aqueous solution of a water-soluble vinyl monomer is in the form of a thin layer having a thickness of 2 to 30 mm, especially 5 to 15 mm, so that a pair of roller cutters rotating in a different direction from each other and engaging with each other can smoothly bite into the gel. Such a sheet-like polymer gel is obtained when the aqueous monomer solution is polymerized in a dish-like or tray-like vessel or on a plate or a moving support such as a belt. The polymerization on a moving belt is preferred, since the obtained polymer gel sheet can be continuously fed to the cutter and the breaking and pulverizing of the polymer gel can be made continuous.

In general, water-soluble polymers are sticky and adhere to a wall of a polymerization vessel or to a moving support. From the viewpoint of workability, it is desirable that the produced polymer gel is easily peeled off from the vessel or support. In order to improve the peelability of the produced polymer gel, known methods may be adopted in the invention, e.g. coating of a releasing agent to the wall of a polymerization vessel, and use of a polymerization vessel whose inner wall is made of a polished stainless steel or covered with a synthetic resin such as polytetrafluoroethylene or polytrifluoroethylene.

Decreasing the stickiness of the polymer gel itself is also desirable in preventing the particles of the pulverized gel from sticking to each other in addition to improving the peelability. The polymerization may be carried out in the presence of agents for preventing the sticking according to known methods. However, the known methods are not always satisfactory, because known agents for preventing the sticking may cause chain transfer reaction to lower the molecular weight of the produced polymer. The present inventors have found that an adduct of an alkylene oxide to distyrenated phenol (polyoxyalkylene distyrenated phenyl ether) is effective for decreasing the stickiness of polymer gels, and when the polyoxyalkylene distyrenated phenyl ether is added to an aqueous solution of water-soluble vinyl monomers to be polymerized, or when the produced polymer gel is covered with the polyoxyalkylene distyrenated phenyl ether, the peelability of the polymer gel from the vessel or support is improved without lowering the molecular weight, and the gel particles are prevented from sticking to each other in pulverizing the gel or in drying the gel particles, thus the breaking of the gel and the pulverization and drying of the gel particles can be conducted easily and efficiently. Also, when the polymerization of an aqueous monomer solution is conducted in the form of a thin layer on a moving support which is provided on its surface with a film of a tetrafluoroethylene-ethylene copolymer, for instance, by means of coating of the copolymer or affixing of the copolymer film with an adhesive, the peelability of the produced polymer gel from the support can be further improved.

The polyoxyalkylene distyrenated phenyl ether used in the invention is one kind of non-ionic surfactant, but is different in chemical structure and stickiness decreasing effect from non-ionic surfactants conventionally used as agent for preventing the sticking, e.g. a polyoxyalkylene alkyl phenyl ether such as polyoxyalkylene octyl phenyl, nonyl phenyl or dodecyl phenyl ether, a polyalkylene glycol fatty acid ester such as polyalkylene glycol oleic or stearic acid ester, a polyethylene glycol sorbitan fatty acid, and a polyoxyalkylene alkyl ether such as poloxyalkylene oleyl or lauryl ether.

When it is desired to prevent the polymer gel particles from sticking to the vessel or to each other and to increase the drying efficiency, it is preferable that the concentration of monomers is as high as possible, at least 20% by weight. Preferably, the concentration of monomers is selected from 25 to 70% by weight in accordance with the kind of the monomers. When the monomer solution is less than 20% by weight, the obtained polymer gel itself is very soft, and it is difficult to break and pulverize the gel into particles even if the polyoxyalkylene distyrenated phenyl ether is used. Also, the monomer concentration should be at most 80% by weight, since the water-solubility of polymer is remarkably decreased and the commercial value is lost.

Examples of the polyoxyalkylene distyrenated phenyl ether are, for instance, adducts of one or more kinds of alkylene oxides such as ethylene oxide, propylene oxide and butylene oxide to distyrenated phenol.

The effect on prevention of sticking has a close relation to the number of moles for the alkylene oxide added to distyrenated phenol. When the HLB of the alkylene oxide adduct is from 5 to 20, preferably 10 to 15, the objects can be attained.

The polyoxyalkylene distyrenated phenyl ether is employed in an amount of 0.001 to 5% by weight, preferably 0.05 to 0.5% by weight, based on the solid matter of the polymer gel. The use in too excess amounts should be avoided, because the surface of the polymer gel particles becomes slimy and the flowabiltiy of the dry powder is lowered.

The polyoxyalkylene distyrenated phenyl ether can be added to an aqueous solution of monomers to be polymerized, whereby the peelability of the produced polymer gel from a polymerization vessel is improved. When the produced polymer gel is easily peeled off from the vessel but it is desired to decrease the stickiness in order to prevent the gel particles from agglomerating upon breaking or pulverizing the gel or upon drying the gel particles, the agglomeration can be prevented by covering the surface of the polymer gel with the polyoxyalkylene distyrenated phenyl ether before breaking the gel or by covering the surface of the polymer gel particles therewith before drying the particles. Of course, the polymerization can be conducted in the presence of the polyoxyalkylene distyrenated phenyl ether and the surfaces of the obtained polymer gel and/or the gel particles can be further covered with the polyoxyalkylene distyrenated phenyl ether. The use of a moving support provided on its surface with a film of a tetrafluoroethylene-ethylene copolymer in the polymerization is advantageous in that the peeling of the polymer gel from the support can be made easier and further it is possible to continuously conduct the procedures of polymerization, breaking the produced gel, pulverizing the gel particles and drying, and also in that the conversion of monomers is improved by the use of the covered support and accordingly problems such as decrease of yield due to lowering of polymerization conversion and environmental pollution due to residual monomer are eliminated.

The tetrafluoroethylene-ethylene copolymer (hereinafter referred to as "TFE-ethylene copolymer") is one of fluorine-containing synthetic resins, but the physical properties of the film thereof, especially the influence on the polymerization of vinyl monomers, are entirely different from those of other fluorine-containing resins such as polytetrafluoroethylene and polytrifluorochloro-ethylene. It has not been known or reported to use the TFE-ethylene copolymer as a covering material of a polymerization apparatus, and also there is no literature suggesting that the TFE-ethylene copolymer covering is excellent in polymerization characteristics as compared with a generally used polytetrafluoroethylene covering.

The thickness of the TFE-ethylene copolymer film on a moving support is usually from 10 to 100 $\mu$m, preferably 25 to 75 $\mu$m.

Usually, copolymers of tetrafluoroethylene and ethylene in a ratio of 4:6 to 7:3 by weight are employed in the invention.

In the present invention, an aqueous polymer gel obtained by polymerizing an aqueous solution of monomers is first broken into small pieces by a specific breaker. The polymer gel is fed to a roller type cutter from the upper portion thereof, and is cut into strips having a width of 3 to 20 mm by a pair of rollers which have a plurality of annular projections or grooves at predetermined intervals on their surfaces and rotate in the opposite direction to each other to engage with each other, for instance, by feeding the gel from the engaging upper portion of the rollers rotating in the downward direction and making the rollers bite into the gel. When the sheet-like polymer gel is continuously taken out of one end of a moving support such as an endless belt and is continuously fed into the roller cutter, it is possible to practice the process of the invention continuously and accordingly to raise the production efficiency. The polymer gel strips are then cut into cubic pieces of 3 to 20 mm in length of a side. In a preferable embodiment of the invention, the gel strips are cut by a combination of a fixed cutting blade extending in the axial direction of the roller cutter over at least the full length of the roller cutter and a rotary cutter including a rotatable cylindrical body provided on its periphery with at least one cutting blade extending in the axial direction of the cylindrical body.

Referring more particularly to FIGS. 1 to 5 showing an embodiment of a breaker used in the invention, a polymer gel is fed to the breaker from the upper portion thereof. The fed gel is cut into strips by a roller type cutter composed of a pair of rollers 3 and 4.

Figure 3:
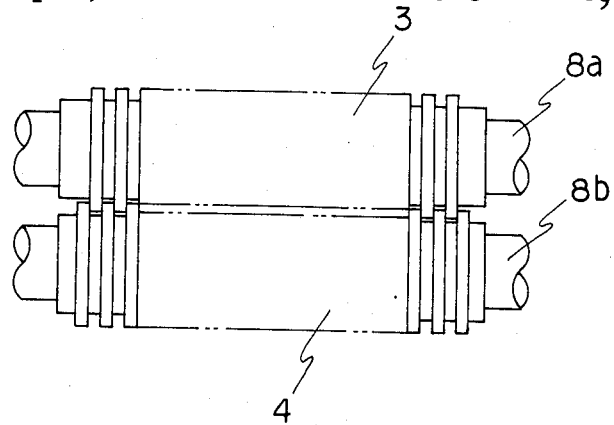
FIG. 3 is a plan view of the breaker device shown in FIG. 1.
Figure 4:
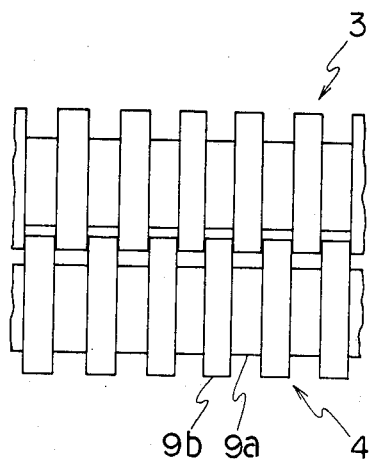
FIG. 4 is a view illustrating the engaging portion of the roller type cutter shown in FIG. 1.
Figure 5:
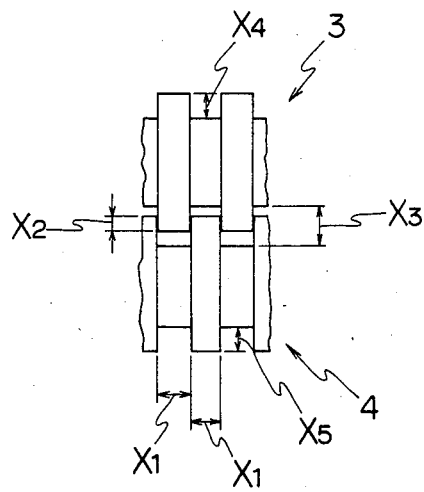
FIG. 5 is a partial enlarged view of the engaging portion shown in FIG. 4.

As shown in FIG. 3, more particularly in FIGS. 4 and 5, cutting blades of the cutter are formed in the form of annular projections or annular grooves on each of the rollers 3 and 4 so as to engage the projections of one roller with the grooves on the other roller. For instance, a pair of the rollers engaging with each other have the same dimensions and rotate at the same speed in the opposite direction to each other so that the fed polymer gel enters into the cutter. The width, depth and height of the projected portion and the grooved portion are determined according to the desired size of the broken polymer gel. For instance, in FIG. 5, the width $X_1$ is from about 2 to about 10 mm, and the depth $X_4$ of the groove is from about 10 to about 15 mm, and the height $X_5$ of the projection is from about 10 to 15 mm. Also, a pair of the rollers 3 and 4 are usually engaged so as to leave a clearance $X_3$ necessary to pass the polymer gel within the range of about 10 to about 25 mm. The rollers 3 and 4 are rotated in the arrow direction as shown in FIG. 2 by rotating rotary shafts 8a and 8b and the fed polymer gel is bitten off and sent downward, whereby the gel is easily cut into strips.

The polymer gel cut into strips by the roller type cutter is then peeled off from the periphery of the annular grooved portions 9a by the top edges of combs 5 and 6 shown in FIG. 2, and sent downward through the space between the comb 5 and the comb 6 to a fixed cutting blade 2 provided at the lower end of the comb 6. Usually, the gel strips do not adhere to the surface of the annular projected portions 9b of the roller cutter. Portions of the strips sent below the position for the fixed blade 2 are cut off by a cutting force acting between the fixed blade 2 and rotary cutting blades 1 provided on the periphery of a cylindrical body 10 which is rotated by a shaft 7, to produce small pieces, especially cubic pieces having a size of about 3 to 20 mm.

The shape of the cross section of the gel strip is determined by machine dimensions of assembled rollers 3 and 4, namely widths $X_1$ of the projection and groove, height $X_4$ and $X_5$, depth $X_2$ of the engaged portion, and rotation speed of the rollers 3 and 4. The cutting length, in other words, the length of the cut piece in the longitudinal direction for the strip, is determined by adjusting the rotation speed of the rollers 3 and 4, the rotation speed of the rotary body 10 which rotates at a speed harmonized or synchronized with the rollers 3 and 4, the number of blades (6 blades in FIG. 2) provided on the rotary body 10, and the width of a space between the blade 1 and the fixed blade 2.

The thus obtained cubic polymer gel pieces may be then dried to give dry particles of water-soluble vinyl polymers. For the purpose of increasing the drying efficiency or other purposes, the wet polymer gel pieces may be further pulverized into particles, especially particles having an average particle size of 0.3 to 3 mm. In the present invention, the pulverization is conducted by using a specific vertical type cutter. At that time, the polymer concentration of the gel is usually from 20 to 60% by weight for the non-ionic or anionic polymers, or from 50 to 90% by weight for the cationic polymers.

It is preferable that the average particle size of the gel pieces to be fed to the vertical type cutter is at most 20 mm. When the average particle size is more than 20 mm, the cutting ability of the vertical type cutter tends to be lowered. If coarse gel pieces having an average particle size of more than 20 mm is fed in excess to the cutter, bad cutting occurs and it causes a vicious circle such as forming agglomerates of gel particles in the cutter and simultaneously generating frictional heat because of stickiness of the gel particles.

The vertical type cutter includes a casing, at least one vertically fixed cutting blade arranged in the casing in a vertical direction, at least one rotary cutting blade provided rotatably and vertically and positioned to minimize a clearance between it and the fixed blade, and a screen which is arranged to form a part of the walls of a cutting chamber and through which the pulverized gel particles are taken out. For instance, the cubic pieces are fed from an upper portion of the casing, and pulverized by the fixed blade and the rotating blade in the cutting chamber formed by the screen and a part of the walls of the casing, and the pulverized gel is taken out through the openings of the screen.

Figure 6:
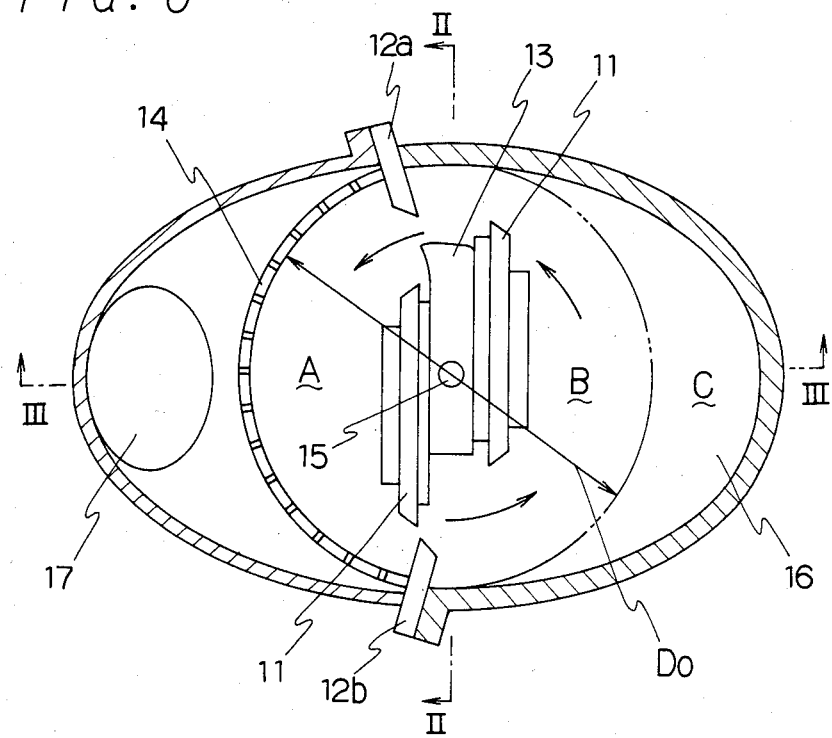
FIG. 6 is a horizontal sectional schematic view showing an embodiment of a vertical type cutter used in the present invention.
Figure 7:
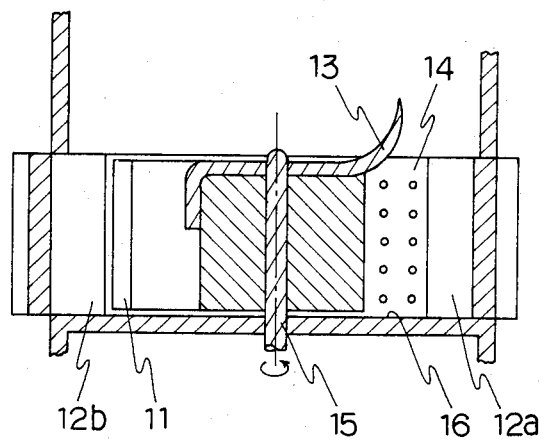
FIG. 7 is a section view taken on line II—II of FIG. 6.
Figure 8:
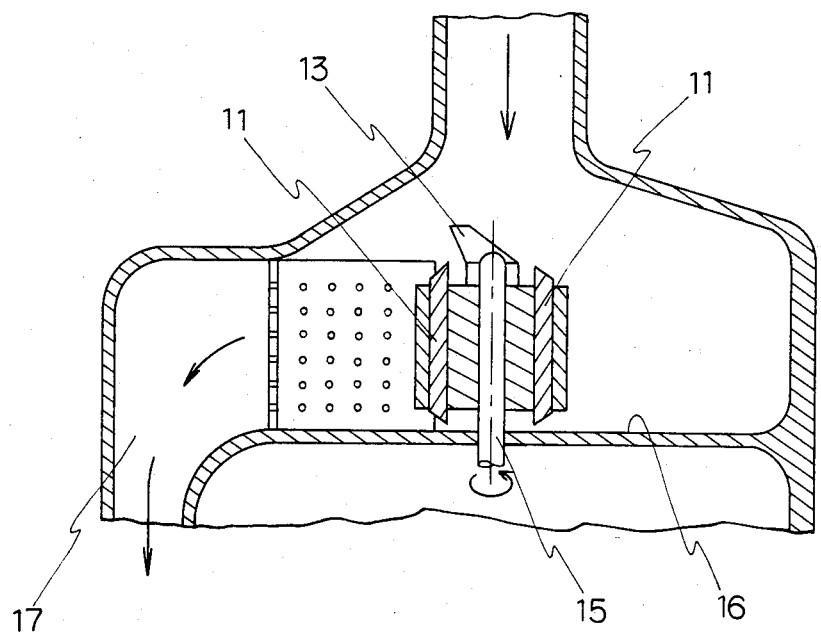
FIG. 8 is a section view taken on line III—III of FIG. 6.
Figure 9:
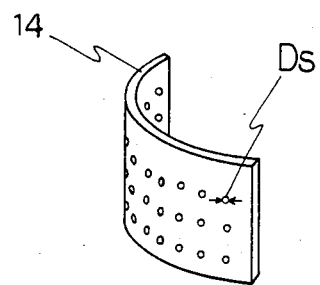
FIG. 9 is a schematic perspective view of a screen shown in FIG. 6.

With reference to FIGS. 6 to 8, a cutting machine used for finely dividing the polymer gel pieces and a process for finely dividing the polymer pieces will be explained below. FIG. 6 is a horizontal sectional schematic view showing a vertical type cutter used for finely dividing the broken polymer gel, and FIGS. 7 and 8 are vertical section views of a part of the cutter.

In FIG. 6, numeral 11 is a rotary cutting blade, 12a and 12b are a first fixed cutting blade and a second fixed cutting blade, 13 is a pre-cutter, 14 is a screen, 15 is a shaft for rotary blade 11, 16 is a bottom surface, and 17 is a discharge hole.

The structural feature of the cutter shown in FIG. 6 resides in that the apparatus has a residence space C crescent in shape when overlooked, which is defined by an area having the same diameter Do as that of the circular arc for screen 14 provided at the outer circumfeence along with the circle formed by the rotating rotary cutter 11 and which is able to make the polymer gel resident for at least 3 minutes, and the driving rotary shaft 15 is arranged vertically, in other words, the cutter is of vertical type.

Gel pieces having a relatively large size, e.g. 10 to 20 mm, among the fed cubic gel pieces having a size of 3 to 20 mm are cut by rotation of cutting edge at the tip of pre-cutter 13 fixed to shaft 15 for the rotary blade 11.

A first important point of the process of the invention is that the cubic gel pieces to be fed are made to fall toward to shaft 15 from the upside of the apparatus along the axis for the shaft 15, whereby the fed particles having a relatively large size can be selectively broken into particles having a size of 3 to 5 mm. The thus broken gel particles are trapped or caught in the clearance of at most 1 mm in width between the rotating blade 11 and the first fixed blade 12a arranged in the body of the vertical cutter as shown in FIG. 6, so as to be cut. The polymer gel particles so cut then move to the second fixed blade 12b through the space A which is defined by the circular arc-shaped screen 14, the circle formed by the rotating blades 11 and the fixed blades 12a and 12b in the direction of the rotation of the rotating blaqes 11.

A second important point of the process of the invention is that among the polymer gel particles which are moving in the space A, the particles having a size smaller than the pore size Ds of the screen 14 scatter outwardly by centrifugal force, pass the pores of the screen 14, and are discharged from the space A to the discharge hole 17, thus the fine particles are separated from coarse particles having a size larger than the pore size Ds.

On the other hand, among the gel particles which are moving in the space A, the particles having a larger size than the pore size Ds of screen 14 are caught between the second fixed blade 12b and the rotary blade 11 so as to be cut into smaller particles, and the cut particles then enter into a space B defined by the rotary blade 11 and the arc of the circle described by the circular arc-shaped screen 14. The, particles which are moving in the space B are again caught in the clearance between the first fixed blade 12a and the rotary blades 11 so as to be cut into smaller particles, thus hereafter the same cutting operations are repeated.

In such a manner, polymer gel particles having a size of 3 to 20 mm fed by causing the particles to fall toward the rotary shaft 15 in line with the axis of the shaft 15 are classified by the screen 14 into particles having a size smaller than the size Ds of the pores of the screen 14, and taken out continuously from the exit hole 17 of the vertical type cutter, thus the desired cutting can be performed.

A third important point of the invention is that the polymer gel particles which have a larger size than the pore size Ds and which are being cut to decrease the size by the rotary blades and the fixed blades, enter into the space B and then stay in the residence space C. The particles which have stayed in the residence space C for at least 3 minutes on the average, are cut again by the rotary blades 11 and the fixed blades 12a and 12b, thus the above-mentioned cutting operation is repeated. Since the average residence time is at least 3 minutes and, moreover, since the particles are rounded by undergoing a granulation action caused by very vigorous mixing and agitation, the shape of the powder product obtained by drying the fine gel particles approximates desirable sheres. Like this, the process of the invention has such a desirable effect that not only the large particles of the polymer gel are finely divided, but also the shape, of the finely divided polymer gel approximates a sphere.

Differing from representative and general pulverizers put on the market such as hammer mill and roll mill, according to the vertical type cutter used in the invention, it is possible to retain the average residence time for a material to be pulverized at least 3 minutes and, therefore, the number of cuttings that the gel particles receive is not large and the gel particles can be discharged with a very few number of cuttings.

The feature of the structure of the vertical type cutter resides in that the residence time for pulverization can be controlled by adjusting the clearance between the edge of the rotary blade 11 and the edge of the fixed blades 12a and 12b arranged vertically around the rotary blade, and changing the size Ds of the openings of the screen, and further by installing a plurality of the vertical type cutters in series, namely by passing the polymer gel through the cutter two to several times, whereby pulverization to fine particles, for instance, having a diameter of less than 1 mm can be made easily. Moreover, there is produced a desirable effect that the shape of the thus obtained fine particles having a particle size of less than 1 mm approximates a sphere. The pulverization technique for polymer gels using a pulverizer having such a structure has not been established.

Preferably, the pulverization by the vertical type cutter is carried out in stages. For instance, when the cut pieces of a polymer gel are pulverized by the vertical type cutter provided with a screen having an opening diameter of 3 mm in the first stage, gel particles having a uniform particle size of not more than about 3 mm are obtained. The gel particles are then pulverized by the cutter provided with a screen having an opening diameter of 2 mm and further by the cutter provided with a screen having an opening diameter of 1 mm, thus roundish fine particles having a particle size of not more than about 1 mm are obtained. Like this, finely divided polymer gel having a desired particle size can be obtained by selecting the screen in accordance with the desired particle size.

According to the above pulverization technique, dust generation scarcely occurs because the polymer gel is subjected to pulverization in the wet state, and also the distribution of the particle size is very narrow.

In breaking the polymer gel to relatively large gel pieces and then pulverizing the gel pieces into fine particles, in order to raise the efficiency and to prevent the gel pieces or the fine particles from sticking to each other, it is preferable to maintain the temperature of the polymer gel as low as possible.

In case of breaking the polymer gel, temperature of the gel can be maintained low, for instance, by sufficiently cooling the produced polymer gel at the step of polymerization, or by cooling the produced polymer gel with cold air or the like prior to feeding to the breaker device. Usually, the polymer gel is maintained at a temperature of 10° to 30° C., preferably not more than 20° C.

Also, cold air, preferably cold air of not more than 25° C., may be blown through the breaker device, whereby increase in stickiness of the polymer gel caused by frictional heat in cutting and driving heat of the roller cutter and agglomeration of the cut pieces can be lightened.

The same effects as those obtained in the step of breaking the polymer gel can be obtained in the step of pulverizing the broken gel by maintaining the temperature of the gel low in the same manner as above, for instance, by cooling the broken gel prior to pulverization, or by passing cold air, preferably cold air of less than 25° C., through the pulverization apparatus.

In the process of the present invention, the polymer gel is finely divided substantially in the wet state. Therefore, the process of the invention can solve the problems encountered by conventional processes wherein the polymer gel is pulverized after drying it (hereinafter referred to as "dry pulverization"), e.g. dust generation, heat generation caused by pulverization, and lowering of molecular weight and formation of waterinsoluble material caused by heat generation. More particularly, since the average residence time in the space C of the pulverizer used in the invention is at least 3 minutes and the pulverizer is of vertical type, formation of very fine powder can be prevented by assistance of water included in the polymer gel to be pulverized, differing from pulverization by usual pulverizers used for dry pulverization having a short residence time, and the shape of the particles is made uniform during the pulverization.

The distribution of particle size of the particles obtained by the process of the invention is very narrow, and such a result has not been obtained by conventional processes.

During breaking and pulverizing in wet state in the present invention, most of the heat generated during breaking and pulverizing is replaced by the latent heat of vaporization of water abundantly included in the polymer gel (e.g. 30 to 70%), whereby marked temperature rise is prevented, and by the effect of preventing the temperature rise, deterioration in quality of polymer such as decrease of molecular weight and formation of water-insoluble material can be prevented. Like this, the process of the invention has excellent advantages in point of preventing the deterioration.

In the breaking step and the following pulverizing step, polyethylene glycol, a non-ionic surfactant or an anionic surfactant may be added to the roller type cutter or the vertical type cutter or may be applied to the surfaces of the cut gel cubic pieces, as occasion demands, in order to prevent the cubic pieces or the fine particles from sticking to each other.

The thus obtained finely divided polymer gel is dried in a known manner, e.g. by hot air drying or throughflow drying on a belt. Usually, a polymer powder having a water content of not more than 10% by weight is obtained by drying at a temperature of 50° to 150° C. for 30 to 60 minutes.

According to the process of the present invention, further pulverization or grading of the powder is not required, but of course may be adopted, as occasion demands.

In case of acrylamide polymers, there is a case where the finely divided polymer gel contains unreacted acrylamide and its content is too large to be used for certain purposes. The present inventors have also found that the residual acrylamide included in the acrylamide polymer gel can be decreased by incorporating an alkaline substance and/or a compound having active hydrogen or capable of producing active hydrogen into the gel particles upon pulverizing gel pieces having an average size of 3 to 20 mm by the above-mentioned vertical type cutter whose average residence time is at least 3 minutes.

For efficiently causing acrylamide to chemically react with an alkaline substance and/or a compound having active hydrogen or capable of producing active hydrogen to decrease acrylamide, it is important to uniformly pulverize a polymer gel, and to uniformly mix the solid gel particles with the reagent which is in the form of liquid or powder so that the reagent is uniformly distributed even into the inside of the polymer gel.

Examples of the alkaline substance are, for instance, sodium hydroxide, potassium hydroxide, soda ash, sodium phosphate, sodium borate, ammonia and other alkaline compounds capable of hydrolyzing acrylamide. The alkaline substance may be in the form of powder, granule, flake, liquid or slurry. Preferably, it is used in the form of powder or slurry from the viewpoint of avoiding sticking of the gel particles to each other. The amount of the alkaline substance is determined according to the desired degree of hydrolysis.

Examples of the compound having active hydrogen and the compound capable of producing active hydrogen are, for instance, sulfites, hydrogensulfites, mercaptocontaining compounds such as mercaptopropionic acid, thioglycollic acid, thioglycerol and thioglycol, aminocontaining compounds such as dimethylamine, methylethylamine, diethylamine, ammonia, dibutylamine, methylethanolamine and diethanolamine, and the like. The compounds having active hydrogen or capable of producing active hydrogen may be used alone or in admixture thereof. The compounds may be used in the form of powder, granule, flake, liquid or slurry. The compounds are used in a stoichiometric amount or in a slight excess amount based on the total amount of residual monomer or monomers included in a polymer gel. In general, the use of not more than about 2% by weight, especially 0.1 to 2% by weight, based on the total amount of the monomer or monomers used for polymerization is sufficient.

The alkaline substance and the compound having active hydrogen or capable of producing active hydrogen may be used alone or in admixture thereof.

The above-mentioned reagents used for decreasing the residual acrylamide included in a polymer gel are added to the vertical type cutter as shown in FIGS. 6 to 8 with the broken polymer gel pieces to be pulverized. Since the average residence time of the gel pieces in the space C of the vertical type cutter is not less than 3 minutes and moreover the gel pieces receive vigorous mixing and agitation action, it is possible to efficiently react the reagent with acrylamide included in the polymer gel so as to decrease the acrylamide content. Thus, the content of acrylamide in the thus obtained fine polymer gel particles is very low.

The polymer gel which has been uniformly admixed with the above-mentioned reagent and finely divided by the vertical type cutter, may be put on the market directly or after coating with surfactants, or may be dried by a drier, e.g. a band type drier, to a water content of at most 10% by weight.

In the case of the compound having active hydrogen or capable of producing active hydrogen, it stoichiometrically reacts with acrylamide remaining in the polymer gel to complete the addition reaction to double bond during the period where it contacts the pulverized gel and penetrates into the inside thereof. Of course, temperature rise of the gel in a drier serves to accelerate the addition reaction.

In the case where the alkaline substance has been used in finely dividing the acrylamide polymer gel by the vertical type cutter, the pulverized gel suffers hydrolysis of the polyacrylamide component during the period until it is dried. The hydrolysis reaction of the pulverized gel is attained in a very short time, e.g. in about 10 to about 15 minutes and, therefore, the time is very short as compared with, for instance, the hydrolysis of cubic polymer gel having a size of 5 mm which requires about 60 to about 90 minutes.

In view of the above advantage in hydrolysis, the present invention also provides a process for preparing a partially hydrolyzed acrylamide polymer most efficiently.

In the above process for preparing a partially hydrolyzed acrylamide polymer, pulverization of aqueous polymer gel pieces and hydrolysis of the polymer by an alkaline substance are simultaneously conducted in the vertical type cutter, and accordingly the process has some problems to be solved further. For instance, when a large amount of an alkaline substance is used in order to prepare a partially hydrolyzed acrylamide polymer having a relatively high degree of hydrolysis, there is a case where much heat of dissolution of the alkaline substance is generated much, thus the gel pieces agglomerate or are not sufficiently pulverized. Also, the high degree of hydrolysis can be attained by conducting the pulverization at an elevated temperature for a sufficient time, but the temperature rise may hinder the pulverization and the time required to combine the vertical type cutters in multi-stages is excessive. Further, it is necessary to remove ammonia gas produced by hydrolysis from the apparatus without allowing leakage to the atmosphere.

The present inventors have found that the above problems can be solved when an acrylamide polymer gel is finely divided into particles having an average particle size of 0.3 to 3 mm by the before-mentioned vertical type cutter to which an alkaline substance or a mixture of the alkaline substance and a compound having active hydrogen or capable of producing active hydrogen is fed with polymer gel pieces having an average particle size of 3 to 20 mm, and the finely divided gel is then mixed by a paddle agitator whose inner wall is covered with a fluorine-containing copolymer and which has paddles on a shaft, the angle of attachment of the paddles to the shaft being variable.

The amount of the alkaline substance is determined according to the desired degree of hydrolysis.

The compound having active hydrogen and the compound capable of producing active hydrogen act to decrease the remaining monomer included in the polymer gel and, therefore, the alkaline substance can be employed in combination therewith in preparing the partially hydrolyzed acrylamide polymers. The compound having or capable of producing active hydrogen is used in the amount mentioned before. The ratio of the compound to the alkaline substance is not particularly limited, and is determined according to the objects, namely hydrolysis and decrease of residual monomers.

Figure 10:
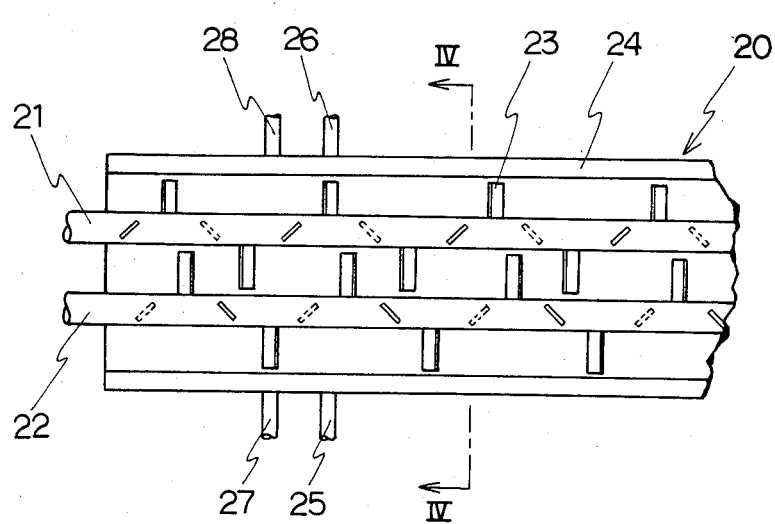
FIG. 10 is a partial illustrative view showing an embodiment of a paddle agitator used in the present invention.
Figure 11:
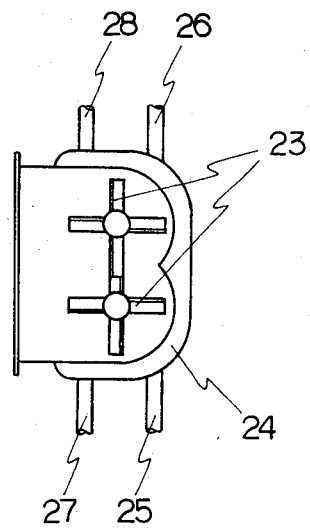
FIG. 11 is a section view taken on line IV—IV of FIG. 10.

The particles of an acrylamide polymer gel recovered from the vertical cutter are further subjected to hydrolysis in a paddle agitator. FIGS. 10 and 11 show an embodiment of paddle agitators used in the present invention. The agitator 20 includes a casing, rotary shafts 21 and 22, and vanes 23 attached to the shafts 21 and 22. The vane angle is variable within the range of 30° to 90° with respect to the shaft 21 or 22, whereby the residence time can be varied so as to adjust the degree of hydrolysis. Since the gel particles fed to the agitator 20 are sufficiently mixed by the paddle-shaped vanes 23 while conveyed to the outlet of the agitator, the alkaline substance or a mixture of the alkaline substance and the compound having or capable of producing active hydrogen is uniformly and efficiently permeated into the inside of the gel particles, thus uniform hydrolysis is performed.

The alkaline substance or a mixture of the alkaline substance and the compound having or capable of producing active hydrogen is usually added to the vertical type cutter with polymer gel pieces upon pulverizing the gel pieces, but it may be added to the paddle agitator without adding to the vertical type cutter, or it may be divided into portions in suitable amounts and added to the cutter and the agitator. In case that a high degree of hydrolysis is desired, from the viewpoint of raising the pulverization efficiency, it is preferable to divide it into two portions, for instance, into halves, and add it to both the cutter and the agitator.

Preferably, the paddle agitator is provided with a jacket 24 so that the agitator can be heated or cooled. For instance, hot water of 60° to 80° C. may be passed through the jacket 24 by utilizing inlet pipe 25 and outlet pipe 26 for jacket cooling water so that the gel particles are agitated under heating to accelerate the hydrolysis, or cold water may be passed by utilizing inlet pipe 27 and outlet pipe 28 for jacket heating steam. When the agitator is heated, the desired hydrolysis can be attained usually in 1 hour.

Ammonia gas produced by hydrolysis of acrylamide polymers is removed, for instance, by sucking the gas with a duct attached to the agitator and introducing it to a tank filled with an aqueous solution of sulfuric acid.

It is necessary that the inner wall of the agitator is covered with a fluorine-containing copolymer, for instance, by coating the copolymer to the wall or adhering a film of the copolymer to the wall with an adhesive or the like. Preferable example of the fluorine-containing copolymer is tetrafluoroethylene-ethylene copolymer.

The copolymer film may be the film deposited with a light reflective metal such as aluminum. The metal deposited copolymer film is attached to the wall of agitator so that the metal layer contacts the wall. When the agitator covered with such a metal deposited copolymer film is used and ultraviolet ray is irradiated to the gel particles from the upper part of the agitator, the monomers remaining in the gel particles can be efficiently decreased, because the reaction with the compound having or capable of producing active hydrogen and the residual monomers is remarkably accelerated, though the detailed mechanism is not made clear. The irradiation of ultraviolet ray can be made easily, for instance, by providing a pressure glass window in a part of upper cover of the agitator or in an upper portion of the casing of the agitator, and providing an ultraviolet ray source such as a low pressure mercury lamp or a xenon lamp over the window.

The partially hydrolyzed polymer gel may be transferred to the drying step, as occasion demands. The drying is conducted in a manner as mentioned before. Also, further pulverization or grading of the wet gel particles or the obtained dry powder may be conducted, as occasion demands.

The present invention is more specifically described and explained by means of the following Examples, in which all % are by weight unless otherwise noted. It is to be understood that the present invention is not limited to the Examples, and various changes and modifications may be made in the invention without departing from the spirit and scope thereof.

EXAMPLE 1

A polymerization vessel equipped with a jacket (a box-shaped vessel having a size of 200 mm in length, 300 mm in width and 50 mm in height and having no upper cover) was placed in a box-shaped small chamber filled with nitrogen gas. An aqueous solution of 150 g of acrylamide, 38 g of acrylic acid and 20 g of sodium hydroxide dissolved in 275 g of demineralized water was degassed with nitrogen gas to remove the dissolved oxygen in a 1 liter cylindrical degassing vessel. To the aqueous monomer solution were then added 5 ml of a 5% aqueous solution of potassium persulfate and 5 ml of a 5% aqueous solution of sodium sulfite. After degassing with nitrogen gas for several minutes, the aqueous solution was introduced to the polymerization vessel, and the polymerization was started, while passing water of 25° C. through the jacket. After about 10 minutes, it was observed that the viscosity of the aqueous monomer solution gradually increased. The aqueous monomer solution showed a gentle flowing state 15 minutes after starting the polymerization. The reaction mixture changed to a hard gel about 2 hours after starting the polymerization. The thickness of the polymer gel was about 8 mm.

Figure 1:
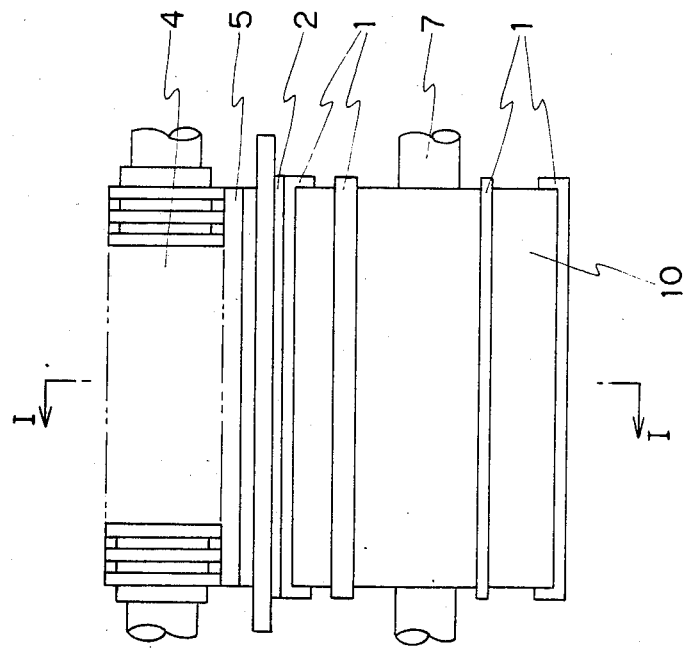
FIG. 1 is a front view showing an embodiment of a breaker device including a roller type cutter used in the present invention.

The obtained polymer gel was then fed to a breaker device as shown in FIGS. 1 to 3 having a roller type cutter, a fixed cutting blade 2 and a rotary cutter rotatable at a speed of 20 to 100 r.p.m. In the roller cutter, the width of annular projections and annular grooves was 5 mm, the depth of the grooves was 15 mm, the height of the projections was 14 mm, and the depth $X_3$ of the engaging portion was 7 mm. The width of the slit between the fixed cutting blade 2 and the edge 1 of the rotary cutter was 0.3 mm. The polymer gel was broken at 20° C. into cubic pieces having a size of about $3 \times 8 \times 5$ mm by rotating the roller type cutter at a surface speed of 30 cm/minute and adjusting the number of rotations of the rotary cutter. The breaking was done with little sticking of the cubic gel pieces to each other.

COMPARATIVE EXAMPLE 1

Extrusion of the polymer gel obtained in Example 1 by a small-scaled meat grinder was attempted, but it was impossible to drive the grinder because the gel was hard.

Polyethylene glycol (molecular weight: 600) was applied to the surface of the polymer gel in an amount of about 1%, and the extrusion was attempted again. The extrusion was made with difficulty. The obtained gel was in the form of strand, and the particles stuck to each other in the twisted state. It was apparently found that the polymer gel was deteriorated by frictional heat and mechanical force.

EXAMPLE 2

After adjusting 500 g of a 80% aqueous solution of N,N,N-trimethylaminoethyl methacrylate chloride to pH 4 with a 10% aqueous solution of hydrochloric acid, the total weight thereof was adjusted to 565 g with distilled water.

The polymerization was conducted in the same manner as in Example 1 except that the above aqueous monomer solution was used. The obtained polymer gel was hard gel having a thickness of 9.4 mm.

The thus obtained polymer gel was broken into cubic pieces having a size of $3 \times 8 \times 5$ mm in the same manner as in Example 1 except that the width of the slit between the fixed cutting edge 2 and the rotary cutting edge 1 was 0.5 mm. The breaking was easy.

COMPARATIVE EXAMPLE 2

The polymer gel obtained in Example 2 was placed in a small-scaled meat grinder, but the breaking was impossible because the gel was too hard and biting was bad.

EXAMPLE 3

A stainless steel endless belt having a width of 450 mm and an effective length of 3,000 mm, the surface of which was covered with a TFE-ethylene copolymer (film thickness: 50 µm) and the back of which was capable of being sprayed with cold or hot water, was installed as a movable support in a chamber filled with nitrogen gas. The belt was moved at a constant rate of 30 mm/minute and water of 25° C. was sprayed to the back of the belt.

About 30 liters of a 75% aqueous solution of N,N,N-trimethylaminoethyl methacrylate chloride adjusted to pH 4 with a 10% aqueous solution of hydrochloric acid was thoroughly degassed with nitrogen gas, and was fed at a constant rate of 10 liters/hour from one end of the belt onto the moving belt.

On the other hand, each of a 5% aqueous solution of potassium persulfate and a 5% aqueous solution of sodium sulfite was fed as a polymerization initiator at a rate of 70 ml/hour from 5 liter temporary storage tanks equipped with a stirrer and installed over the belt. The initial solutions were admixed with the monomer solution and the mixture was continuously fed onto the belt.

In case of the above conditions, the time in which the monomer solution was subjected to the polymerization on the moving belt was 100 minutes, the thickness of the monomer solution layer on the moving belt was about 12 mm, and the total time required in the polymerization was 2 hours.

A polymer in the form of a sheet having a thickness of about 12 mm was obtained from another end of the endless belt 120 minutes after starting feed of the aqueous monomer solution. The produced polymer sheet was easily peeled off from the belt surface by human power and continuous polymerization for about 3 hours was possible. The temperature of the obtained polymer gel was about 28° C.

The polymer gel sheet taken out continuously from the end of the endless belt was continuously fed to the breaker device, and was broken in the same manner as in Example 1 except that the slit width between the fixed cutting edge and the rotary cutting edge was 0.5 mm. Cubic gel pieces having a size of about $5 \times 12 \times 5$ mm were continuously taken out with little sticking of the gel pieces to each other.

When the gel sheet was broken with blowing cold air of about 15° C. into the feed port of the breaker device, the broken gel became hard and frictional heat of the breaker device scarcely generated, thus the efficiency was remarkably improved.

EXAMPLE 4

An aluminum deposited tetrafluoroethylene-ethylene copolymer film was attached to the surface of a stainless steel endless belt having a width of 450 mm and an effective length of 3,000 mm so that the metallized surface came into contact with the belt surface. The endless belt was placed as a movable support in a chamber filled with nitrogen gas, while sprayers were arranged so that hot water or cold water could be sprayed to the back of the endless belt. The endless belt was operated at a rate of 100 mm/minute, and water of 15° C. was sprayed upwardly to the belt. Also, low pressure mercury lamps were arranged as a ultraviolet ray source over the endless belt so that the intensity of ultraviolet rays was 50 W/m$^2$ at the belt surface.

About 40 liters of a 75% aqueous solution of N,N,N-trimethylaminoethyl methacrylate adjusted to pH 4 with a 10% aqueous solution of hydrochloric acid was thoroughly degassed with nitrogen gas, and was fed at a constant rate of 13.5 liters/hour onto one end of the moving belt.

On the other hand, a 5% methanol solution of benzoin isopropyl ether was fed as a polymerization initiator at a rate of 30 ml/hour from a 5 liter temporary storage tank equipped with a stirrer and arranged over the belt. The initiator solution and the monomer solution were uniformly admixed and fed onto the belt to conduct the photopolymerization by ultraviolet irradiation.

In case of the above conditions, the time in which the monomer solution was irradiated with ultraviolet rays on the moving belt was 30 minutes, and the thickness of the layer of the fed monomer solution was about 5 mm.

A sheet of the produced polymer having a thickness of 5 mm was obtained from another end of the belt 30 minutes after starting the feed of the monomer solution. The produced polymer sheet was easily peeled off from the belt surface by human power and the continuous polymerization for about 3 hours was possible. The temperature of the obtained polymer gel was 20° C.

The polymer gel sheet taken out continuously from the end of the belt was continuously fed to a breaker device as shown in FIGS. 1 to 3 and having a width of annular projections and grooves of 5 mm, a depth of the groove of 15 mm and a height of the projection of 14 mm and a rotary cutter rotatable at a speed of 20 to 100 r.p.m. The width of the slit between the fixed cutting edge 2 and the rotary cutter edge 1 was 0.5 mm. The polymer gel was broken by rotating the roller type cutter at a surface speed of 100 mm/minute and adjusting the number of rotations of the rotary cutter. Cubic polymer gel particles having a size of about $3 \times 5 \times 5$ mm were continuously obtained from the outlet of the breaker without sticking to each other.

EXAMPLE 5

An aqueous solution of 200 g of acrylamide dissolved in 275 g of demineralized water was subjected to degassing and polymerization in the same manner as in Example 1. The polymerization began about 10 minutes after starting the polymerization, and the viscosity of the solution gradually increased. The solution showed a gentle flowing state 15 minutes after starting the polymerization. The reaction mixture changed to a hard gel about 2 hours after starting the polymerization. The thickness of the gel was about 8 mm.

The obtained polymer gel was broken into cubic particles in the same manner as in Example 1 except that the depth $X_3$ of engagement was 12 mm and the surface speed of the rotary cutter was 10.5 cm/minute. The size of the obtained cubic particles was about $3 \times 8 \times 3$ mm.

The obtained cubic particles were then fed to a vertical type cutter as shown in FIGS. 6 to 8 having a screen 14 of 3 mm in opening diameter, by causing the particles to fall from the feed port toward shaft 15, while passing cold air of about 15° C. through the vertical cutter. The obtained particles were further pulverized by the vertical type cutter having screen 14 of 2 mm in opening diameter and then by the vertical type cutter having screen 14 of 1 mm in opening diameter, thus the particles having a particle size of about 1 mm were obtained.

The polymer gel particles having a size of about 1 mm were dried by hot air at 80° C. for about 25 minutes to give dry powder having a uniform particle size. The powder had an intrinsic viscosity of 23 dl/g, and could provide an aqueous solution containing no water-insoluble material and was useful as a flocculant.

COMPARATIVE EXAMPLE 3

The cubic polymer gel particles having a size of $3 \times 8 \times 3$ mm obtained in Example 5 were dried by hot air at 80° C. It took about 60 minutes to reduce the water content to less than 10%.

The obtained dry cubic particles were then pulverized by a Fitz mill having a screen of about 1 mm in opening diameter. Very fine powder of 100 mesh pass was formed much (about 3.43%), and dusting was remarkable. The obtained powder had an intrinsic viscosity of 21.5 dl/g.

EXAMPLE 6

The procedure of Example 3 was repeated to give cubic polymer gel particles having a size of about $5 \times 12 \times 5$ mm.

The obtained cubic particles were then pulverized by the vertical type cutter in the same manner as in Example 5 to give polymer gel particles having a uniform particle size of about 1 mm. The thus obtained particles were dried at 80° C. by a through-flow dryer of band type. After about 15 minutes, dry powder having a water content of less than 10% was obtained.

The obtained dry powder had an intrinsic viscosity of 7.0 dl/g, and was completely soluble in water.

EXAMPLE 7

The cubic polymer gel particles having a size of about $5 \times 12 \times 5$ mm obtained in Example 6 were dried under the same condition as in Example 6 without pulverizing. About 40 minutes were required in drying to a water content of less than 10%. The obtained dry particles had an intrinsic viscosity of 6.8 dl/g.

EXAMPLE 8

The polymerization and breaking procedures of Example 4 were repeated to give cubic polymer gel particles having a size of 3×5×5 mm.

The obtained cubic particles were then pulverized by the vertical type cutter in the same manner as in Example 5 to give particles having a uniform particle size of about 1 mm. The obtained particles were dried at 80° C. by a through-flow dryer of band type. After about 13 minutes, dry powder having a water content of less than 10% was obtained.

The obtained dry powder did not contain a water-insoluble material, and had an intrinsic viscosity of 7.8 dl/g.

EXAMPLE 9

The cubic polymer gel particles having a size of about 3×5×5 mm obtained in Example 8 were dried under the same conditions as in Example 8 without pulverizing by the vertical type cutter. After about 35 minutes, the water content decreased to less than 10%.

The obtained dry particles had an intrinsic viscosity of 7.5 dl/g.

EXAMPLE 10

The polymerization procedure of Example 3 was repeated except that polyoxyethylene distyrenated phenyl ether (HLB 10) was added to the aqueous monomer solution of N,N,N-trimethylaminoethyl methacrylate chloride in an amount of 0.1% based on the monomer and a movable belt having no TFE-ethylene copolymer covering on its surface was used. The time in which the monomer solution was subjected to the polymerization on the moving belt was 120 minutes, and the thickness of the monomer solution layer on the belt was about 12 mm. The total time required in the polymerization was 2 hours.

A sheet-like polymer gel having a thickness of about 12 mm was obtained from one end of the moving belt 120 minutes after starting feed of the monomer solution. The produced polymer sheet was in the state that it could be easily peeled off from the belt surface by human power. It was attempted to continuously peel off the polymer gel sheet from the belt surface by causing the sheet to be engaged between a pair of roller cutters 3 and 4 shown in FIGS. 1 to 3. The continuous peeling was possible.

EXAMPLE 11

A sheet-like gel prepared in the same manner as in Example 1 was broken in the same manner as in Example 1 except that the roller type cutter had a width of the projection and groove of 4 mm, a depth of the groove of 10 mm, a height of the projection of 10 mm and a depth of engagement of 7 mm, to form cubic particles having a size of about 3×4×3 mm.

The cubic particles were then pulverized in three stages by the vertical type cutter in the same manner as in Example 5 except that a slurry of 20 g of caustic soda flake and 3 g of sodium sulfite in 20 g of water was gradually added to the vertical type cutter in the first pulverization stage. The sum of the average residence times of the particles in the space C of the cutters used in the first, second and third stages was about 21 minutes. The thus pulverized polymer gel had a uniform particle size of about 1 mm.

The obtained polymer gel particles having a particle size of about 1 mm were dried by hot air at 80° C. After 30 minutes, powder having a water content of less than 10% and a uniform particle size was obtained. The powder had an intrinsic viscosity of 25 dl/g, and about 20% by mole of the acrylamide component in the polymer was hydrolyzed. The content of the residual acrylamide in the powder was 0.038%, whereas the cubic polymer gel particles to be pulverized contained about 1.8% of the residual acrylamide based on the solid matter.

The powder was completely soluble in water, and no water-insoluble material was seen in a 0.1% aqueous solution of the powder.

EXAMPLE 12

The same polymerization apparatus used in Example 4 was used. About 40 liters of a 40% aqueous solution of acrylamide adjusted to pH 8 with a 10% aqueous solution of caustic soda and thoroughly degassed with nitrogen gas was fed at a constant rate of 13.5 liters/hour onto one end of the moving stainless steel belt having an aluminum-deposited TFE-ethylene copolymer covering. A 5% methanol solution of benzoin isopropyl ether initiator was fed at a rate of 30 ml/hour, while uniformly admixing with the aqueous monomer solution, to conduct the photopolymerization by ultraviolet irradiation. In case of the above conditions, the time in which the monomer solution was irradiated with ultraviolet rays on the moving belt was 30 minutes, and the thickness of the layer of the fed monomer solution was about 5 mm. A sheet-like polymer gel of about 5 mm in thickness was obtained from another end of the belt 30 minutes after starting the feed of monomer solution. The produced polymer sheet was in the state that it could be easily peeled off from the belt by human power, and the continuous polymerization for about 3 hours was possible. The temperature of the obtained polymer gel was about 20° C.

The polymer gel sheet obtained continuously from the end of the belt was broken by the roller type cutter into cubic pieces having a size of about 3×5×3 mm, and then pulverized by the vertical type cutter into particles having a particle size of about 1 mm in the same manner as in Example 5 except that a slurry (specific gravity: 1.51) of 2 kg of caustic soda flake and 0.27 kg of sodium sulfite in 2.27 kg of pure water was fed to the vertical type cutter in the first stage at a rate of 1.0 liter/hour. The sum of the average residence times of the particles in the space C of the vertical cutters was about 30 minutes.

The polymer gel particles having a particle size of about 1 mm were dried at 80° C. by a through-flow dryer of belt type. After about 20 minutes, powder having a water content of less than 10% was obtained.

The obtained powder had an intrinsic viscosity of 24 dl/g, a degree of hydrolysis of about 20% by mole, a residual acrylamide content of 0.047%. No water-insoluble material was seen in a 0.1% aqueous solution of the powder.

EXAMPLE 13

A polymer gel was prepared in the same manner as in Example 12 except that a 60% aqueous solution (specific gravity: 1.11) consisting of 20 kg of a 50% aqueous acrylamide solution, 25 kg of a 80% aqueous N,N,N-trimethylaminoethyl methacrylate chloride solution and 5 kg of pure water was used instead of a 40% aqueous solution of acrylamide.

The obtained polymer gel sheet having a thickness of 5.0 mm was continuously fed to the roller type cutter shown in FIGS. 1 to 3 to break into cubic particles having a size of about 3×5×3 mm.

The cubic gel particles were then fed to a vertical type cutter shown in FIGS. 6 to 8 provided with a screen 14 having an opening diameter of about 3 mm, while passing cold air of about 15° C. and feeding a 30% aqueous slurry of sodium hydrogensulfite at a rate of 0.12 liter/hour. The obtained particles were further pulverized by the vertical cutter having a screen of about 2 mm in opening diameter and the vertical cutter having a screen of about 1 mm in opening diameter in that order. The sum of the average residence times of the particles in the space C of the cutters was about 30 minutes.

The obtained polymer gel particles having a particle size of about 1 mm were dried at 80° C. by a hot air dryer. After 20 minutes, powder having a water content of least than 10% was obtained.

The obtained powder had an intrinsic viscosity of 8.5 dl/g and a residual acrylamide content of 0.065%. The content of N,N,N-trimethylaminoethyl methacrylate chloride units in the polymer was 40% by mole. No water-insoluble material was seen in a 0.1% aqueous solution of the powder.

EXAMPLE 14

In 500 g of demineralized water was dissolved 400 g of acrylamide, and 20 g of a 1% aqueous solution of potassium persulfate, 5 g of 1% aqueous solution of sodium hydrogensulfite and 1 g of sodium dioctyl sulfosuccinate were dissolved in the obtained aqueous monomer solution. The total amount of the aqueous solution was then adjusted to 1,000 g with demineralized water. the aqueous solution was placed in a degassing vessel, and nitrogen gas was passed through the solution to remove the dissolved oxygen. The polymerization was carried out in a box-shaped stainless steel polymerization vessel having a size of 100 mm in length, 100 mm in width and 150 mm in height at an atmospheric temperature of 30° C. for 3 hours.

The obtained polymer was in the form of a high elastic gel. The mass of the polymer gel was ground to particles having a particle size of about 5 mm by an electric meat grinder. The coarse particles were then pulverized in three stages by a vertical type cutter shown in FIGS. 6 to 8. The first stage, screen 14 of 3 mm in opening diameter was used, and the gel particles were fed to the vertical type cutter with 55 g of caustic soda particles having an average particle size of 1 mm. The total contact time of the gel particles and caustic soda was 15 minutes. In the second and third stages, a screen of 1.5 mm in opening diameter and a screen of 0.8 mm in opening diameter were used, respectively. The finally obtained polymer gel particles had an average particle size of about 0.8 mm.

The thus obtained particles were mixed for about 30 minutes in a paddle agitator having the structure as shown in FIGS. 10 and 11, and then dried at 80° C. by a hot air drier to give a powder having a water content of 8.3%.

The obtained powdery polyacrylamide had a degree of hydrolysis of about 25% by mole and an intrinsic viscosity of 23 dl/g in 1N NaCl. It was completely soluble in water, and no water-insoluble material was seen. The content of the residual acrylamide in the powdery polymer was 0.18%.

EXAMPLE 15

The procedure of Example 14 was repeated except that 5 of sodium sulfite powder was added with caustic soda particles. The obtained powdery polyacrylamide had a water content of 8.0%, a degree of hydrolysis of about 22% by mole, and intrinsic viscosity of 22.5 dl/g in 1N NaCl. The powdery polymer was completely soluble in water, and no water-insoluble material was observed. The content of the residual acrylamide in the powdery polymer was 0.03%.

EXAMPLE 16

The procedure of Example 12 was repeated except that a slurry (specific gravity: 1.55) of 4 kg of caustic soda flake, 0.3 kg of sodium sulfite in 4.3 kg of pure water was added to the vertical type cutter in the first pulverization stage at a rate of 1.85 liter/hour.

The obtained polymer gel particles having a particle size of about 1 mm and containing caustic soda and sodium sulfite were mixed at 50° C. under irradiation of low pressure mercury lamp in a paddle agitator having the structure shown in FIGS. 10 and 11 and covered with a TFE-ethylene copolymer film having an aluminum deposition layer on the back surface. The average residence time in the agitator was about 30 minutes. The particles were then dried at 80° C. for about 30 minutes by a through-flow dryer of band type.

The obtained powdery polyacrylamide had a water content of 8.5%, an intrinsic viscosity of 25.5 dl/g in 1N NaCl, and a degree of hydrolysis of about 45% by mole. The content of the residual acrylamide in the powder was 0.024%. A water-insoluble material was scarcely observed in a 1% aqueous solution of the powder.

In addition to the ingredients used in the Examples, other ingredients can be used in the Examples as set forth in the specification to obtain substantially the same results.

What we claim is:

1. A process for preparing dry, spherical, polymer gel, powder particles from an aqueous polymer gel in a wet state obtained by subjecting an aqueous solution of a water-soluble vinyl monomer to polymerization which comprises feeding said polymer gel in a wet state into a roller cutter including a pair of cutter rollers wherein the rollers bite into said polymer gel with a plurality of annular projections or grooves at predetermined intervals on surfaces of the rollers, said rollers rotating in the opposite directions to each other to engage with each other, thereby cutting the polymer gel into strips; thereafter cutting said strips in a wet state into pieces by a combination of a fixed cutting blade with a rotary cutter, said fixed cutting blade extending in the axial direction of said roller cutter over at least the full length of said roller cutter and said rotary cutter including a rotatable cylindrical body provided on its periphery with at least one cutting blade extending in the axial direction; pulverizing the obtained pieces of polymer gel in a wet state into fine, round particles with a vertical type cutter comprising a casing, at least one vertically fixed cutting blade arranged in said casing in a vertical direction, at least one rotary cutting blade arranged rotatably and vertically in said casing and positioned to minimize the clearance between an edge of the rotary cutting blade and an edge of the fixed cutting blade, said vertical type cutter having a residence space wherein the polymer gel pieces to be pulverized are located, and the residence time of the polymer gel pieces in said residence space being at least 3 minutes; and drying said fine, round particles.

2. The process of claim 1, wherein said polymerization is conducted on a support and the said polymer gel is continuously fed to said roller cutter.

3. The process of claim 1, wherein said polymerization is conducted by irradiating ultraviolet rays to said aqueous solution of a water-soluble vinyl monomer.

4. The process of claim 1, wherein said cutting into strips and cutting into pieces are conducted with passing cold air having temperature of not more than 25° C. through said roller cutter.

5. The process of claim 1, wherein said pieces of polymer gel are continuously pulverized, while passing cold air having a temperature of not more than 25° C. through said vertical type cutter.

6. The process of claim 1, wherein said aqueous solution of a water-soluble vinyl monomer contains a polyoxyalkylene distyrenated phenyl ether.

7. The process of claim 1, wherein said polymer gel is covered with a polyoxyalkylene distyrenated phenyl ether.

8. The process of claim 1, wherein said pieces of polymer gel are covered with a polyoxyalkylene distyrenated phenyl ether.

9. The process of claim 1, wherein the gel in the wet state contains polymer concentrations from 20 to 60% by weight for non-ionic polymers and anionic polymers and from 50 to 90% by weight for cationic polymers.

10. The process of claim 1, further comprising separating the polymer gel particles having a size smaller than a pore size of a screen defining the residence space within said vertical type cutter by passing smaller size particles through the screen to be discharged from the cutter.

11. The process of claim 1, wherein said pieces of polymer gel are made to fall toward a shaft of said vertical type cutter along the axis a shaft so that relatively large pieces can be broken into particles of a smaller size by cutting means arranged on the shaft.

12. The process of claim 1, wherein said pieces of polymer gel are cubic pieces having a size of 3 to 20 mm obtained by continuously cutting a polymer gel prepared by subjecting an aqueous solution of a water-soluble vinyl monomer to polymerization in the form of a thin layer on a support, and are pulverized into fine, round particles having an average particle size of 0.3 to 3 mm by said vertical type cutter.

13. The process of claim 12, wherein said polymerization is conducted by irradiating ultraviolet rays to the thin layer of said aqueous solution.

14. The process of claim 1, wherein said pieces of polymer gel are cubic pieces having a size of 3 to 20 mm obtained by cutting an acrylamide polymer gel prepared by polymerizing an aqueous solution of an acrylamide series monomer, and the pulverization by said vertical type cutter into fine round particles is conducted by feeding said pieces of an acrylamide polymer gel with at least one member selected from the group consisting of an alkaline substance and a compound having active hydrogen or capable of producing active hydrogen.

15. The process of claim 14, wherein said compound having active hydrogen or capable of producing active hydrogen is a member selected from the group consisting of a sulfite, a hydrogensulfite, a mercapto-containing compound and an amino-containing compound.

16. The process of claim 1, wherein said pieces of polymer gel are acrylamide polymer gel pieces having a size of 3 to 20 mm and are fed to said vertical cutter with an alkaline substance or a mixture of an alkaline substance and a compound having or capable of producing active hydrogen, and the obtained fine, round particles having a particle size of 0.3 to 3 mm are mixed by a paddle agitator, thereby performing partial hydrolysis of the acrylamide polymer, said paddle agitator having an inner wall covered with a film of a fluorine-containing copolymer and paddles whose angle of attachment to a shaft is variable.

17. The process of claim 16, wherein the fine round particles of a partially hydrolyzed acrylamide polymer taken out from said paddle agitator are dried by hot air.

18. The process of claim 16, wherein said film of a fluorine-containing copolymer is provided on its back surface with a layer of a light reflective metal, and the mixing of said fine round particles by said paddle agitator is conducted under irradiation of ultraviolet rays.

19. The process of claim 16, wherein said fine round particles are fed to said paddle agitator with an alkaline substance or a mixture of an alkaline substance and a compound having or capable of producing active hydrogen.

* * * * *